US007490431B1

(12) United States Patent
Kerwood

(10) Patent No.: US 7,490,431 B1
(45) Date of Patent: Feb. 17, 2009

(54) BAIT LAUNCHING ACCESSORY FOR FISHING POLES AND ASSOCIATED METHOD

(76) Inventor: Michael Kerwood, 31139 Old River Rd., Bonsall, CA (US) 92003

( * ) Notice: Subject to any disclaimer, the term of this patent is extended or adjusted under 35 U.S.C. 154(b) by 0 days.

(21) Appl. No.: 11/998,308

(22) Filed: Nov. 29, 2007

Related U.S. Application Data

(60) Provisional application No. 60/861,282, filed on Nov. 29, 2006.

(51) Int. Cl.
*A01K 91/02* (2006.01)
(52) U.S. Cl. ............................................. 43/19; 43/4.5
(58) Field of Classification Search ..................... 43/19, 43/4.5; 124/20.1
See application file for complete search history.

(56) References Cited

U.S. PATENT DOCUMENTS

| | | | | | |
|---|---|---|---|---|---|
| 1,376,260 | A | * | 4/1921 | Davis | 43/19 |
| 1,457,983 | A | * | 6/1923 | Malone | 43/6 |
| 2,090,731 | A | * | 8/1937 | Klein | 43/19 |
| 2,153,315 | A | * | 4/1939 | Richter | 43/19 |
| 2,247,561 | A | * | 7/1941 | Rowe | 43/19 |
| 2,345,043 | A | * | 3/1944 | Hall | 43/19 |
| 2,569,604 | A | * | 10/1951 | Hall | 43/19 |
| 2,645,218 | A | * | 7/1953 | Fisher | 43/19 |
| 2,808,043 | A | * | 10/1957 | Lombard | 43/19 |
| 2,823,483 | A | * | 2/1958 | Malott | 43/19 |
| 2,849,824 | A | * | 9/1958 | McGee | 43/19 |
| 2,948,078 | A | * | 8/1960 | Miotke | 43/19 |
| 2,963,016 | A | * | 12/1960 | Andis | 43/19 |
| 2,970,839 | A | * | 2/1961 | Halverson | 43/6 |
| 3,059,370 | A | * | 10/1962 | Moore | 43/19 |
| 3,084,467 | A | * | 4/1963 | Bromwell | 43/19 |
| 3,108,583 | A | * | 10/1963 | Andis | 43/19 |
| 3,129,525 | A | * | 4/1964 | Lewis | 43/19 |
| 3,138,149 | A | * | 6/1964 | Sinclair | 43/19 |
| 3,143,823 | A | * | 8/1964 | Brown et al. | 43/19 |
| 3,154,063 | A | * | 10/1964 | White | 43/43.11 |
| 3,172,226 | A | * | 3/1965 | Andis | 43/19 |
| 3,314,186 | A | * | 4/1967 | Viveiros | 43/19 |
| 3,355,836 | A | * | 12/1967 | Hanson | 43/19 |
| 3,401,480 | A | * | 9/1968 | Halstead | 43/19 |
| 3,559,328 | A | * | 2/1971 | Lesher | 43/19 |
| 3,683,882 | A | * | 8/1972 | Braxton | 43/19 |
| 3,742,637 | A | * | 7/1973 | Badovinac | 43/19 |
| 3,949,730 | A | * | 4/1976 | Schoenberger | 43/19 |
| 4,014,126 | A | * | 3/1977 | Samuels et al. | 43/19 |
| 4,024,667 | A | * | 5/1977 | Wegener | 43/19 |
| 4,040,198 | A | * | 8/1977 | Skibo | 43/19 |
| 4,127,956 | A | * | 12/1978 | Hertkorn | 43/19 |
| D264,988 | S | * | 6/1982 | Finlay | D22/141 |
| 4,587,943 | A | * | 5/1986 | Ross | 43/19 |

(Continued)

FOREIGN PATENT DOCUMENTS

FR        2665334 A1 * 2/1992

(Continued)

*Primary Examiner*—Darren W Ark

(57) ABSTRACT

A fishing pole accessory includes a base assembly, a platform pivotally coupled to a top end of the base assembly, a plurality of arms directly connected to the platform, a sling with opposed ends anchored to the arms in such a manner that the sling is resiliently adapted between stretched and equilibrium positions, and a mounting clamp pivotally coupled directly to the base assembly which is articulated about a second axis registered orthogonal to the first axis.

5 Claims, 5 Drawing Sheets

U.S. PATENT DOCUMENTS

| | | | | |
|---|---|---|---|---|
| 4,674,471 | A * | 6/1987 | Lance | 43/19 |
| 4,773,179 | A * | 9/1988 | Corley | 43/19 |
| 5,038,510 | A * | 8/1991 | Duke | 43/19 |
| 5,119,579 | A * | 6/1992 | Hullihen et al. | 43/19 |
| 5,363,584 | A * | 11/1994 | Lo | 43/19 |
| 5,493,807 | A * | 2/1996 | Sullins | 43/19 |
| 5,553,413 | A * | 9/1996 | Gannon | 43/6 |
| 6,053,156 | A * | 4/2000 | Boon | 124/20.1 |
| 6,055,764 | A * | 5/2000 | Armanno, Sr. | 43/19 |
| 6,209,531 | B1 * | 4/2001 | Boon | 124/20.1 |
| 6,286,495 | B1 * | 9/2001 | Brown | 124/20.1 |
| 6,754,968 | B2 * | 6/2004 | Lee | 124/18 |
| 7,409,794 | B2 * | 8/2008 | Triano et al. | 43/19 |
| 2007/0144505 | A1 * | 6/2007 | McCallister et al. | 124/20.1 |
| 2007/0214705 | A1 * | 9/2007 | Osenbauch et al. | 43/19 |

FOREIGN PATENT DOCUMENTS

| | | | |
|---|---|---|---|
| FR | 2676116 | A1 * | 11/1992 |
| FR | 2739528 | A1 * | 4/1997 |
| FR | 2795912 | A1 * | 1/2001 |
| FR | 2843451 | A1 * | 2/2004 |
| GB | 2176081 | A * | 12/1986 |
| GB | 2258377 | A * | 2/1993 |
| GB | 2262019 | A * | 6/1993 |
| GB | 2269519 | A * | 2/1994 |
| GB | 2282517 | A * | 4/1995 |
| GB | 2284528 | A * | 6/1995 |
| GB | 2360187 | A * | 9/2001 |
| GB | 2380921 | A * | 4/2003 |
| GB | 2428172 | A * | 1/2007 |
| WO | WO 9628968 | A1 * | 9/1996 |
| WO | WO 2004064514 | A1 * | 8/2004 |

* cited by examiner

BAIT LAUNCHING ACCESSORY FOR FISHING POLES AND ASSOCIATED METHOD

CROSS REFERENCE TO RELATED APPLICATIONS

This application claims the benefit of U.S. Provisional Application No. 60/861,282, filed Nov. 29, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to fishing poles and, more particularly, to a fishing pole accessory for launching bait from a fishing pole in space-limited areas.

2. Prior Art

Fishing is a great, lifelong activity that can be enjoyed by anyone. It is a fun, healthy, inexpensive sport to pursue that can be as simple as using a worm on a hook tied to some line on a long stick or pole. Fishing, whether it be ocean, lake, stream or pond fishing, is not only the most popular but probably the oldest pastime pursued by man. Fishing is a popular sport because anyone can engage in it, regardless of age, sex or income.

The most complicated part about fishing is finding a place to fish. But with the incredible wealth of waters found in most parts of the U.S., anglers can find a good fishing hole practically right in their own backyard. There are literally thousands of ponds and lakes, and tens of thousands of miles of rivers and streams scattered across the country. Most of these waters are home to numerous species of fish that anglers can catch.

Finding a good fishing spot does not necessarily ensure a successful fishing trip as, on many occasions, whether fishing from a bank, pier or boat, fish can be seen literally jumping out of the water but the distance is to far to successfully cast the bait anywhere near the fish. When fishing from a boat, the boat can be moved but, almost inevitably, the fish will be gone by the time the boat has reached the desired spot. It is desirable to deploy a baited hook or lure for a much greater distance than can be normally achieved by overhead casting.

U.S. Pat. No. 4,127,956 to Hertkorn discloses a target fishing apparatus which, when attached to a conventional rod and reel assembly, allows casting of a baited hook to a desired location. The unit may be used in areas where restricted overhead clearance precludes conventional casting. Actuation of a trigger mechanism causes an elastic member to propel a lure and attached line from a bait cup toward the target area. Unfortunately, this prior art example is not designed for attachment to a boat or pier rail.

U.S. Pat. No. 6,754,968 to Lee discloses an aiming apparatus for a slingshot. The aiming apparatus comprises a light projecting device adapted to project a light beam. A mounting apparatus is adapted to support the light projecting device on the slingshot and disposes the light projecting device with the light beam directed toward a target of a user of the slingshot. Unfortunately, this prior art example is not designed for attachment to a boat or pier rail.

Accordingly, the present invention is disclosed in order to overcome the above noted shortcomings. The present invention is convenient and easy to use, lightweight yet durable in design, and designed for launching bait from a fishing pole in a space-limited area. The present invention is simple to use, inexpensive, and designed for many years of repeated use.

BRIEF SUMMARY OF THE INVENTION

In view of the foregoing background, it is therefore an object of the present invention to provide an apparatus for launching bait from a fishing pole in space-limited areas. These and other objects, features, and advantages of the invention are provided by a fishing pole accessory.

A fishing pole accessory includes a base assembly linearly adjustable along a first axis. Such a base assembly includes first and second tubular female shafts centrally aligned along the first axis and a rectilinear male shaft interfitted within the first and second female shafts. Such a male shaft effectively has a top end statically nested within the first tubular female shaft and maintaining a fixed spatial relationship therewith. The base assembly further includes a rotatable knob with a drive rod attached directly thereto and penetrated through the male shaft. A toothed gear is seated within the male shaft and extends along a longitudinal length thereof, and such a drive rod is statically affixed to the second female shaft and dynamically engaged with the gear such that the second female shaft linearly displaces along the first axis as the knob is rotated along first and second rotational directions.

The assembly further includes a platform pivotally coupled to a top end of the base assembly and is articulated about a fulcrum axis registered orthogonal to the first axis. Such a platform includes a bracket conveniently protruding downwardly from a bottom surface thereof, and such a bracket is pivotally coupled directly to the first female shaft.

The assembly further includes a plurality of arms directly connected to the platform and extending upwardly therefrom. Such arms are advantageously positioned at an anterior side of the platform and are equidistantly spaced apart along two symmetrically opposed curvilinear paths.

The assembly further includes a sling with opposed ends anchored to the arms in such a manner that the sling is resiliently adapted between stretched and equilibrium positions when pulled rearwardly from the arms and along a path registered substantially orthogonal to the first axis. Such a sling includes a pouch seated substantially medially between the arms, and first and second deformably resilient elastic bands having looped ends are directly connected to top regions of the arms respectively. Each of such first and second elastic bands further have opposed ends statically engaged with lateral sides of the pouch such that an equal tension is effectively maintained between the first and second elastic bands when the pouch is pulled rearwardly behind the arms during launching procedures.

The assembly further includes a mounting clamp pivotally coupled directly to the base assembly which is conveniently articulated about a second axis registered orthogonal to the first axis. Such a mounting clamp includes a C-shaped housing pivotally connected directly to a bottom end of the second female shaft, and a fastener rotatably engaged with the housing and the second female shaft in such a manner that the housing is adjustably locked at alternate positions defined along an arcuate path extending about the bottom end of the second female shaft.

The mounting clamp further includes a primary rod threadably penetrated through a distal end of the housing and extending along a rectilinear path defined between a proximal end and the distal end of the housing respectively. Such a primary rod has a longitudinal length registered parallel and orthogonal to a longitudinal length of the male shaft when the housing is articulated between first and second positions respectively. An auxiliary rod is passed through a distal end of the primary rod and is oriented perpendicular thereto for assisting a user to quickly rotate the primary rod between extended and retracted positions. Such an auxiliary rod is disposed exterior of the housing. The platform is spaced from the mounting clamp.

A method for launching bait attached to a fishing line of a fishing pole in space limited area includes the steps of: providing a base assembly linearly adjustable along a first axis; pivotally coupling a platform to a top end of the base assembly by articulating the platform about a fulcrum axis registered orthogonal to the first axis; directly connecting a plurality of arms to the platform by extending the arms upwardly therefrom; anchoring opposed ends of a sling to the arms in such a manner that the sling is resiliently adapted between stretched and equilibrium positions when pulled rearwardly from the arms and along a path registered substantially orthogonal to the first axis; pivotally coupling a mounting clamp directly to the base assembly by articulating the mounting clamp about a second axis registered orthogonal to the first axis; attaching the mounting clamp to a support surface; positioning the fishing rod alongside the sling; pointing the sling to a desired direction; placing a baited hook in the sling; pulling the sling rearwardly away from an anterior side of the platform until a desired tension in the sling is achieved; and releasing the sling to launch the baited hook.

The method further includes the steps of: centrally aligning first and second tubular female shafts along the first axis; interfitting a rectilinear male shaft within the first and second female shafts by statically nesting a top end of the male shaft within the first tubular female shaft; penetrating a drive rod of a rotatable knob through the male shaft; and linearly displacing the second female shaft along the first axis by rotating the knob along first and second rotational directions respectively.

The method further includes the step of: pivotally coupled a bracket of the platform directly to the first female shaft; seating a pouch substantially medially between the arms; directly connecting looped ends of the first and second deformably resilient elastic bands to top regions of the arms respectively; and statically engaging opposed ends of each of the first and second elastic bands with lateral sides of the pouch such that an equal tension is maintained between the first and second elastic bands when the pouch is pulled rearwardly behind the arms during launching procedures.

The method further includes the steps of: pivotally connecting a C-shaped housing to a bottom end of the second female shaft; rotatably engaging a fastener with the housing and the second female shaft in such a manner that the housing is adjustably locked at alternate positions defined along an arcuate path extending about the bottom end of the second female shaft; threadably penetrating a primary rod through a distal end of the housing by extending the primary rod along a rectilinear path defined between a proximal end and the distal end of the housing respectively; and passing an auxiliary rod through a distal end of the primary rod in such a manner that the auxiliary rod is disposed exterior of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
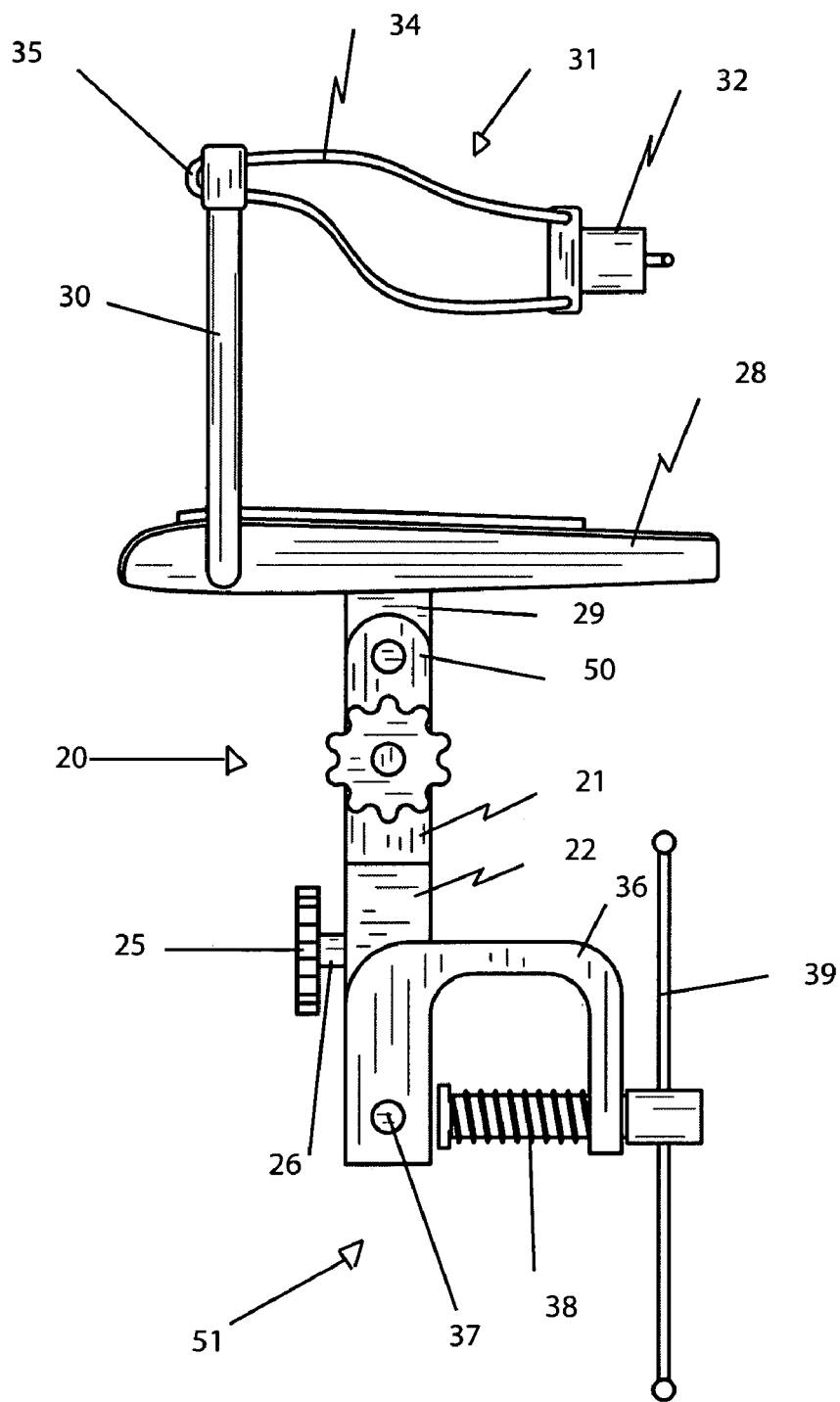
FIG. 1 is a side elevational view showing a fishing pole accessory, in accordance with the present invention.
Figure 2:
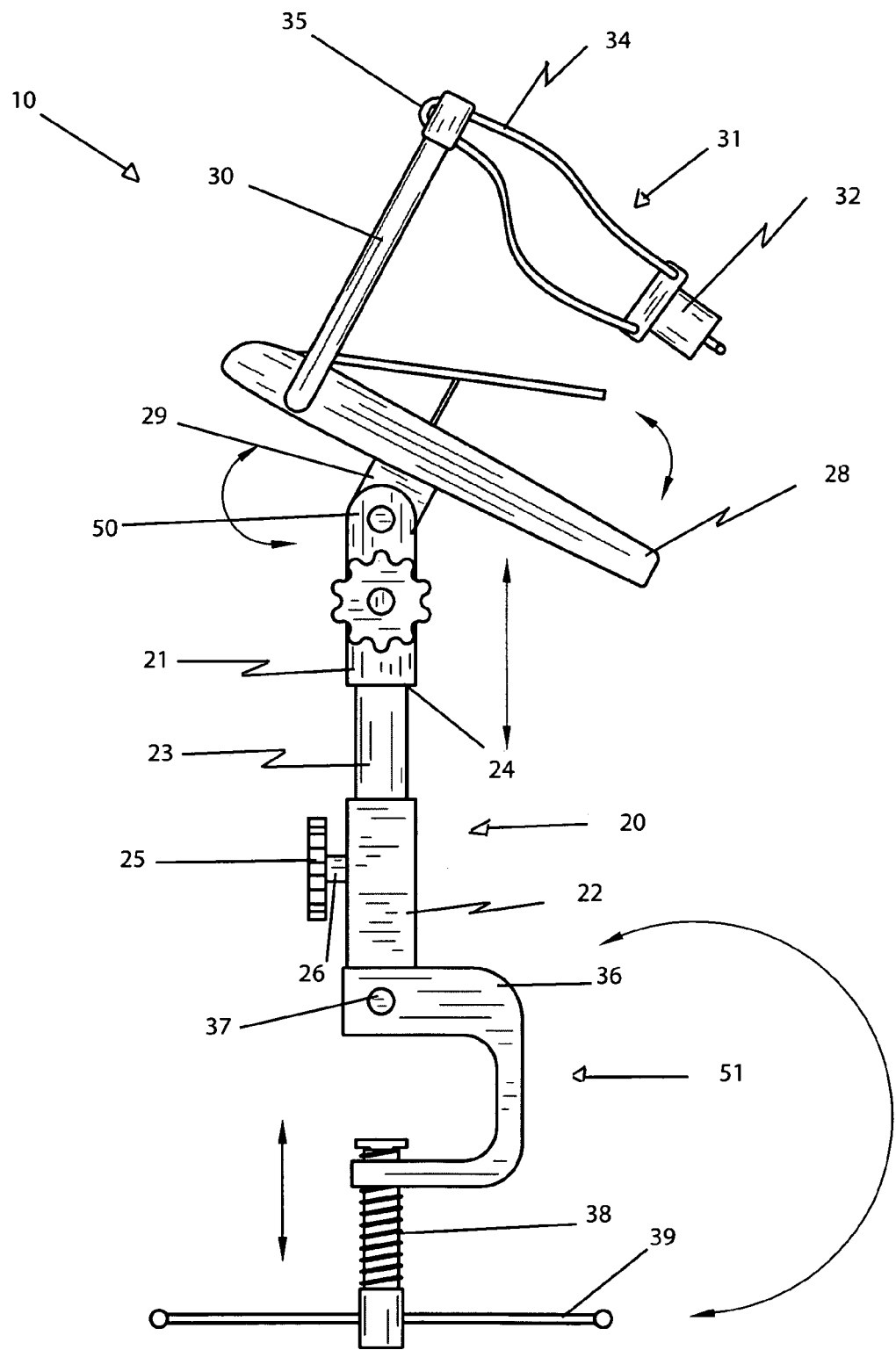
FIG. 2 is a side elevational view of a fishing pole accessory, showing the pivotal motion of the platform and mounting clamp, in accordance with the present invention.
Figure 3:
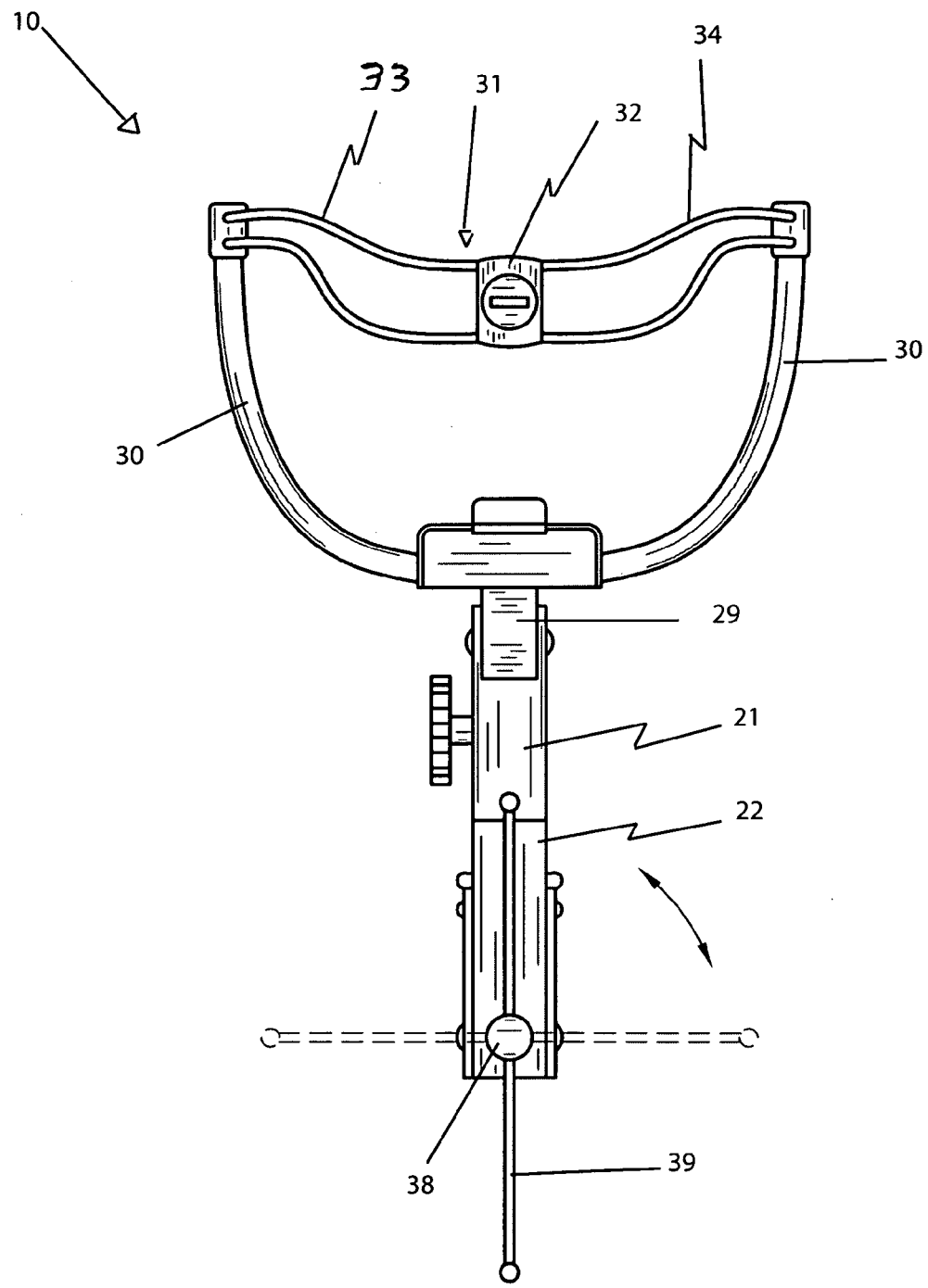
FIG. 3 is a front elevational view of a fishing pole accessory, showing the pivotal movement of the auxiliary rod, in accordance with the present invention.
Figure 4:
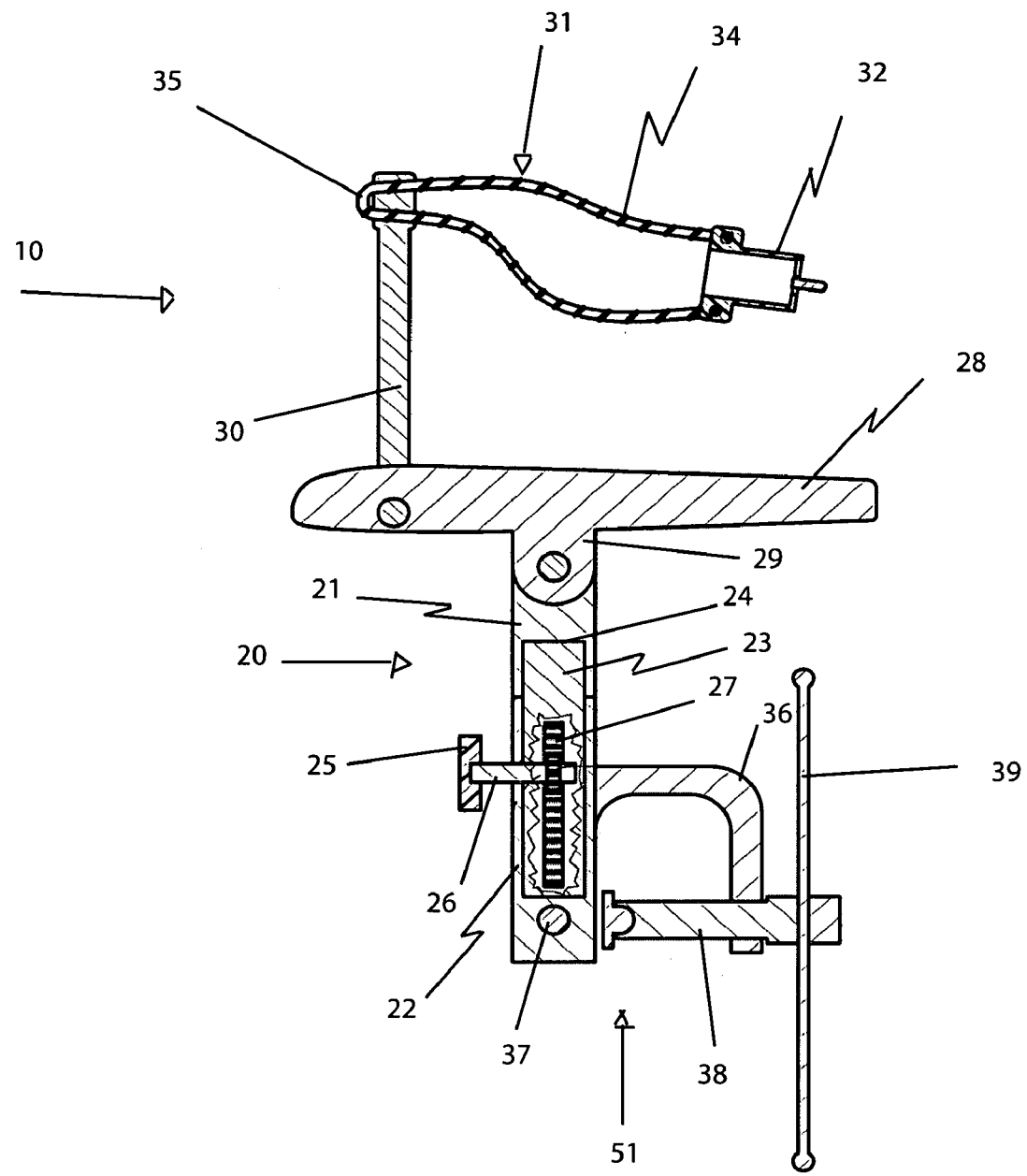
FIG. 4 is a cross sectional view of a fishing pole accessory, as seen in FIG. 2.
Figure 5:
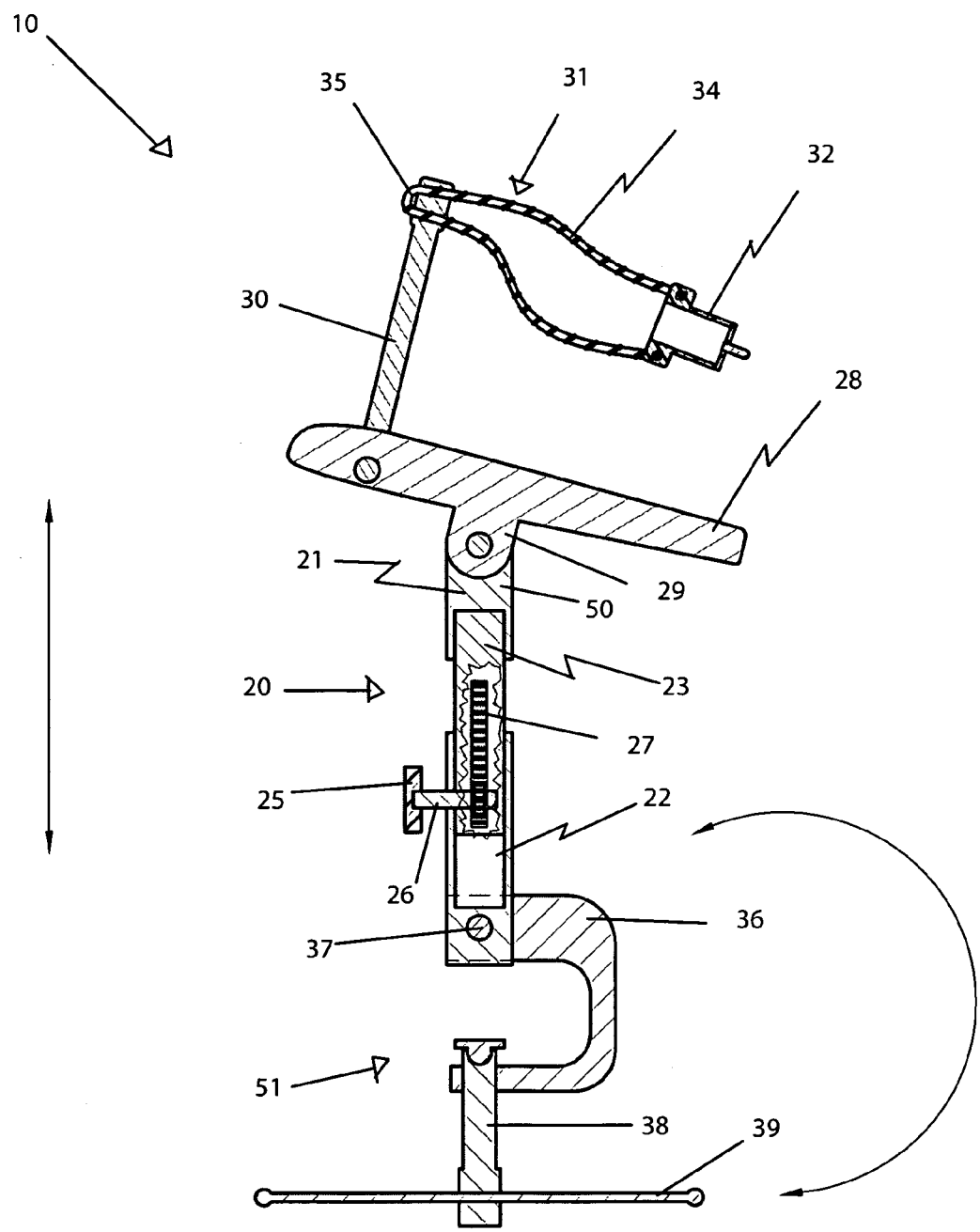
FIG. 5 is a cross sectional view of a fishing pole accessory, as seen in FIG. 1.

The apparatus of this invention is referred to generally in FIGS. 1-5 by the reference numeral 10 and is intended to protect a fishing pole accessory. It should be understood that the apparatus 10 may be used to protect many different types of fishing poles and should not be limited in use with those poles mentioned herein.

Referring initially to FIGS. 1, 2, 3, 4 and 5, a fishing pole accessory 10 includes a base assembly 20 linearly adjustable along a first axis. Such a base assembly 20 includes first and second tubular female shafts 21, 22 centrally aligned along the first axis and a rectilinear male shaft 23 interfitted within the first and second female shafts 21, 22. Such a male shaft 23 has a top end 24 statically nested within the first tubular female shaft 21 and maintaining a fixed spatial relationship therewith. The base assembly 20 further includes a rotatable knob 25 with a drive rod 26 attached directly, without the use of intervening elements, thereto and penetrated through the male shaft 23. A toothed gear is seated 27 within the male shaft 23 and extends along a longitudinal length thereof, and such a drive rod 26 is statically affixed to the second female shaft 22 and dynamically engaged with the gear 27 which is essential such that the second female shaft 22 linearly displaces along the first axis as the knob 25 is rotated along first and second rotational directions. The base provides a support for a pivotally coupled platform 28, and can be adjusted to various heights as needed.

Referring again to FIGS. 1, 2, 3, 4 and 5, the assembly 10 further includes a platform 28 pivotally coupled to a top end 50 of the base assembly 20 and is articulated about a fulcrum axis registered orthogonal to the first axis. Such a platform 28 includes a bracket 29 protruding downwardly from a bottom surface thereof, and such a bracket 29 is pivotally coupled directly, without the use of intervening elements, to the first female shaft 21. The pivotal motion of the platform 28 enables the user to adjust the accessory 10 to fit their specific needs.

Referring to FIGS. 1, 2, 3, 4 and 5, the assembly 10 further includes a plurality of arms 30 directly connected, without the use of intervening elements, to the platform 28 and extending upwardly therefrom. Such arms 30 are positioned at an anterior side of the platform 28 and are equidistantly spaced apart along two symmetrically opposed curvilinear paths.

Referring again to FIGS. 1, 2, 3, 4 and 5, the assembly 10 further includes a sling 31 with opposed ends anchored to the arms 30 in such a manner that the sling 31 is resiliently adapted between stretched and equilibrium positions when pulled rearwardly from the arms 30 and along a path registered substantially orthogonal to the first axis. Such a sling 31 includes a pouch 32 seated substantially medially between the arms 30, and first and second deformably resilient elastic bands 33, 34 having looped ends 35 are directly connected, without the use of intervening elements, to top regions of the arms 30 respectively. Each of such first and second elastic bands 33, 34 further have opposed ends statically engaged with lateral sides of the pouch 32 which is vital such that an equal tension is maintained between the first and second elastic bands 33, 34 when the pouch 32 is pulled rearwardly behind the arms 30 during launching procedures. The sling 28 is used for forcefully throwing a fishing line into the water. The further back the sling 28 is pulled, the further the fishing line will be thrown.

Referring again to FIGS. 1, 2, 3, 4 and 5, the assembly 10 further includes a mounting clamp 51 pivotally coupled directly, without the use of intervening elements, to the base assembly 20 which is articulated about a second axis registered orthogonal to the first axis. Such a mounting clamp 51 includes a C-shaped housing 36 pivotally connected directly, without the use of intervening elements, to a bottom end of the second female shaft 22, and a fastener 37 rotatably engaged with the housing 36 and the second female shaft 22 in such a manner that the housing 36 is adjustably locked at alternate positions defined along an arcuate path extending about the bottom end of the second female shaft 22.

The mounting clamp 35 further includes a primary rod 38 threadably penetrated through a distal end of the housing 36 and extending along a rectilinear path defined between a proximal end and the distal end of the housing 36 respectively. Such a primary rod 38 has a longitudinal length registered parallel and orthogonal to a longitudinal length of the male shaft 23 when the housing 36 is articulated between first and second positions respectively. An auxiliary rod 39 is passed through a distal end of the primary rod 38 and is oriented perpendicular thereto for assisting a user to quickly rotate the primary rod 38 between extended and retracted positions. Such an auxiliary rod 39 is disposed exterior of the housing 36. The platform 28 is spaced from the mounting clamp 35. The mounting clamp 51 is provided for attachment of the accessory 10 to a boat or pier rail.

The assembly includes a mounting clamp, a base assembly, a rectangular platform, two vertically positioned arms, and a sling. Of course, the assembly could be produced in two versions, one for freshwater use and another non-corrosive version for saltwater use, as is obvious to a person of ordinary skill in the art. The mounting clamp extends downwardly from a bottom surface of the circular base and is substantially C-shaped. Such a clamp includes two clamping arms that are advantageously tightened or loosened by use of an adjustment knob that is attached to a rear side of the clamp. Of course, the clamp may be secured to a boat rail, pipe, or pier rail, to name only a few, as is obvious to a person of ordinary skill in the art.

The base includes a circular plate that is directly attached, without the use of intervening elements, to the upper clamp arm. Such a base also includes a tubular shaft that extends upwardly from the plate. The top end of the tubular shaft is rigidly attached to the bottom surface of the rectangular platform and is pivotally connected to the top surface of the circular base plate. A circular knob is positioned on the side of the tubular shaft. Such a knob is loosened in order to swivel the shaft and is tightened to effectively keep the shaft stationary.

The vertically positioned arms have bottom ends attached to the left and right sides of the rectangular platform and top ends attached the sling, respectively. Such a sling includes two sturdy rubber straps and a recessed cup or pouch that is directly connected, without the use of intervening elements, to the arms. The recessed cup is conveniently removable from the rubber straps, which is crucial for allowing the cup to be periodically washed by the user.

In use, the fishing pole accessory assembly is attached to a boar or pier rail and the angler's fishing rod is positioned alongside. The assembly is then pointed in the desired direction, the tubular shaft is tightened, and the baited hook or lure that is attached to the fishing line is placed in the recessed cup. The fisherman then simply pulls the recessed cup backward until the desired tension on the rubber straps are achieved and releases the cup to effectively launch the bait or lure.

The present invention, as claimed, provides the unexpected and unpredictable benefit of an assembly that is convenient and easy to use, is durable in design, is light weight and portable, and improves a user's chance of hooking a fish. The use of such a fishing pole apparatus enables a user to cast their hooked bait within confined spaces without the risk of hitting fellow anglers during the process. By casting the bait beyond the bait of other anglers, the user also has an increased chance of hooking a fish with their solo piece of bait. The fishing pole accessory can also conveniently be attached to a variety of support surfaces, thus making it versatile in use.

In use, a method for launching bait attached to a fishing line of a fishing pole in space limited area includes the steps of: providing a base assembly 20 linearly adjustable along a first axis; pivotally coupling a platform 28 to a top end 50 of the base assembly 20 by articulating the platform 28 about a fulcrum axis registered orthogonal to the first axis; directly connecting, without the use of intervening elements, a plurality of arms 30 to the platform 28 by extending the arms 30 upwardly therefrom; anchoring opposed ends of a sling 31 to the arms 30 in such a manner that the sling 31 is resiliently adapted between stretched and equilibrium positions when pulled rearwardly from the arms 30 and along a path registered substantially orthogonal to the first axis; pivotally coupling a mounting clamp 29 directly, without the use of intervening elements, to the base assembly 20 by articulating the mounting clamp 29 about a second axis registered orthogonal to the first axis; attaching the mounting clamp 29 to a support surface; positioning the fishing rod alongside the sling 31; pointing the sling 31 to a desired direction; placing a baited hook in the sling 31; pulling the sling 31 rearwardly away from an anterior side of the platform 28 until a desired tension in the sling 31 is achieved; and releasing the sling 31 to launch the baited hook.

In use, the method further includes the steps of: centrally aligning first and second tubular female shafts 21, 22 along the first axis; interfitting a rectilinear male shaft 23 within the first and second female 21, 22 shafts by statically nesting a top end 24 of the male shaft 23 within the first tubular female shaft 21; penetrating a drive rod 26 of a rotatable knob 25 through the male shaft 23; and linearly displacing the second female shaft 22 along the first axis by rotating the knob 25 along first and second rotational directions respectively.

In use, the method further includes the step of: pivotally coupled a bracket 29 to the platform 28 directly, without the use of intervening elements, to the first female shaft 21; seating a pouch 32 substantially medially between the arms 30; directly connecting, without the use of intervening elements, looped ends 35 of the first and second deformably resilient elastic bands 33, 34 to top regions of the arms 30 respectively; and statically engaging opposed ends of each of the first and second elastic bands 33, 34 with lateral sides of the pouch 32 such that an equal tension is maintained between the first and second elastic bands 33, 34 when the pouch 32 is pulled rearwardly behind the arms 30 during launching procedures.

In use, the method further includes the steps of: pivotally connecting a C-shaped housing 36 to a bottom end of the second female shaft 22; rotatably engaging a fastener 37 with the housing 36 and the second female shaft 22 in such a manner that the housing 36 is adjustably locked at alternate positions defined along an arcuate path extending about the bottom end of the second female shaft 22; threadably penetrating a primary rod 38 through a distal end of the housing 36 by extending the primary rod 38 along a rectilinear path defined between a proximal end and the distal end of the housing 36 respectively; and passing an auxiliary rod 39 through a distal end of the primary rod 38 in such a manner that the auxiliary rod 39 is disposed exterior of the housing 36.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A method for launching bait attached to a fishing line of a fishing pole in space limited area, said method comprising the steps of:
   a. providing a base assembly linearly adjustable along a first axis;
   b. pivotally coupling a platform to a top end of said base assembly by articulating said platform about a fulcrum axis registered orthogonal to said first axis;
   c. directly connecting a plurality of arms to said platform by extending said arms upwardly therefrom;
   d. anchoring opposed ends of a sling to said arms in such a manner that said sling is resiliently adapted between stretched and equilibrium positions when pulled rearwardly from said arms and along a path registered substantially orthogonal to said first axis;
   e. pivotally coupling a mounting clamp directly to said base assembly by articulating said mounting clamp about a second axis registered orthogonal to said first axis;
   f. attaching said mounting clamp to a support surface;
   g. positioning the fishing rod alongside said sling;
   h. pointing said sling to a desired direction;
   i. placing a baited hook in said sling;
   j. pulling said sling rearwardly away from an interior side of said platform until a desired tension in said sling is achieved; and
   k. releasing said sling to launch the baited hook.

2. The method of claim 1, wherein step a. comprises the steps of:
   centrally aligning first and second tubular female shafts along the first axis,
   interfitting a rectilinear male shaft within said first and second female shafts by statically nesting a top end of said male shaft within said first tubular female shaft;
   penetrating a drive rod of a rotatable knob through said male shaft; and
   linearly displacing said second female shaft along said first axis by rotating said knob along first and second rotational directions respectively.

3. The method of claim 2, wherein step b. comprises the step of:
   pivotally coupling a bracket of said platform directly to said first female shaft.

4. The method of claim 3, wherein step e. comprises the steps of:
   pivotally connecting a C-shaped housing pivotally to a bottom end of said second female shaft;
   rotatably engaging a fastener with said housing and said second female shaft in such a manner that said housing is adjustably locked at alternate positions defined along an arcuate path extending about said bottom end of said second female shaft;
   threadably penetrating a primary rod through a distal end of said housing by extending said primary rod along a rectilinear path defined between a proximal end and said distal end of said housing respectively; and
   passing an auxiliary rod through a distal end of said primary rod in such a manner that said auxiliary rod is disposed exterior of said housing.

5. The method of claim 1, wherein step d. comprises the steps of:
   seating a pouch substantially medially between said arms;
   directly connecting looped ends of said first and second deformably resilient elastic bands to top regions of said arms respectively; and
   statically engaging opposed ends of each of said first and second elastic bands with lateral sides of said pouch such that an equal tension is maintained between said first and second elastic bands when said pouch is pulled rearwardly behind said arms during launching procedures.

* * * * *